July 25, 1961  G. E. WOMBLE  2,993,608
LOADER
Filed March 14, 1957  3 Sheets-Sheet 3
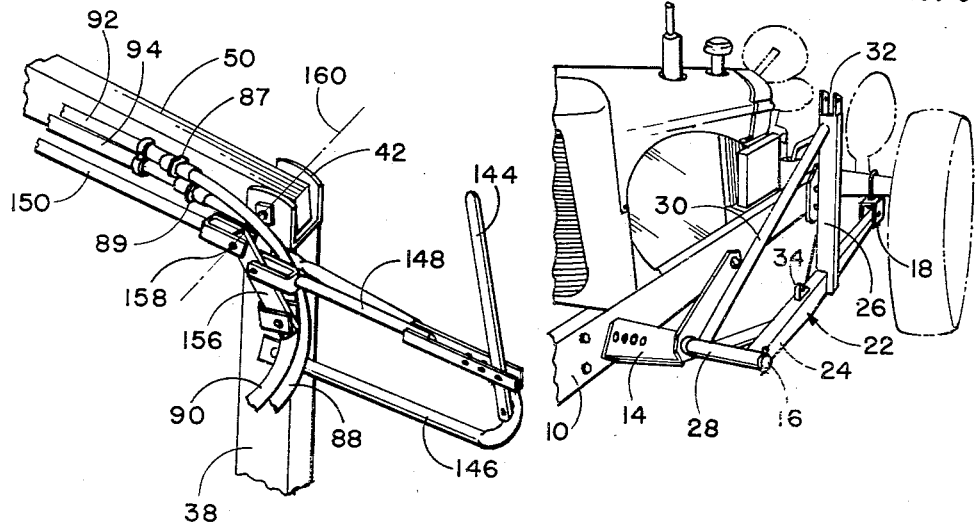
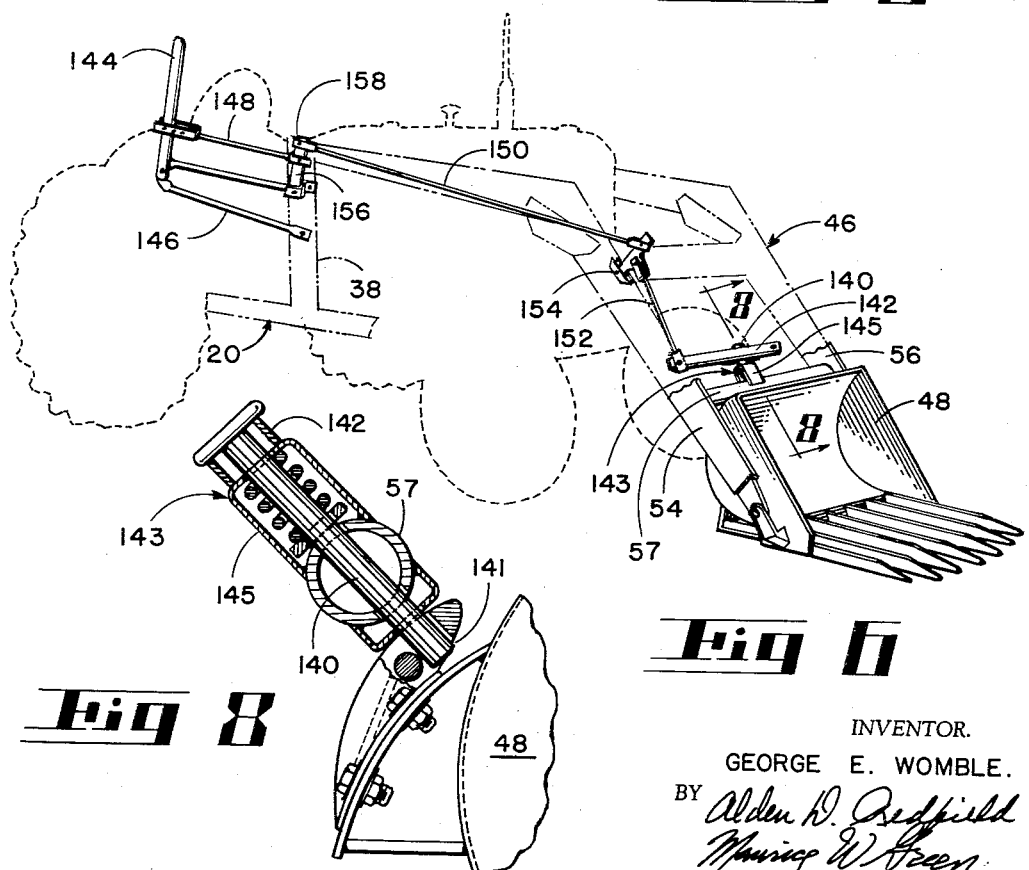
INVENTOR.
GEORGE E. WOMBLE.
BY
ATTORNEYS.

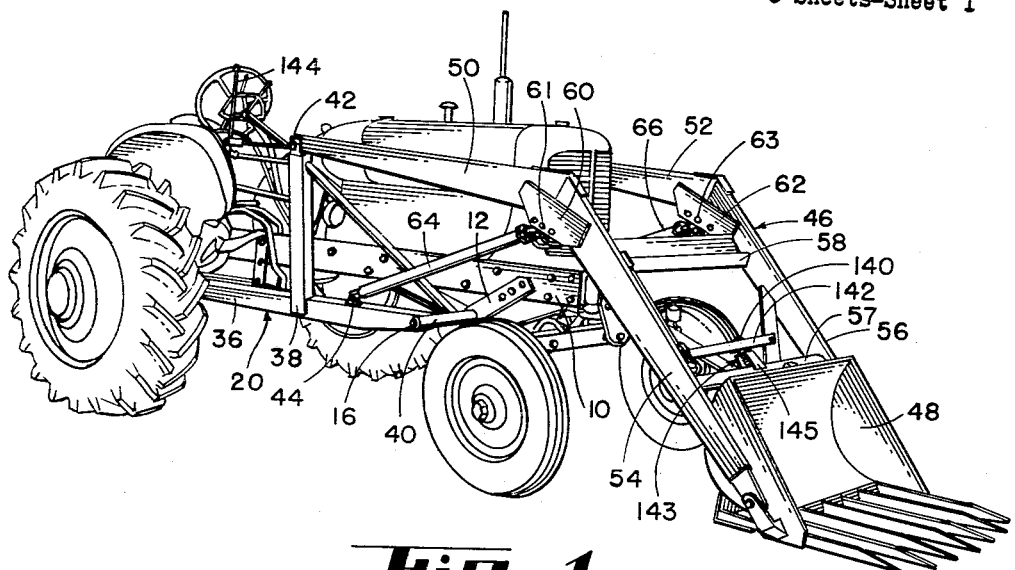

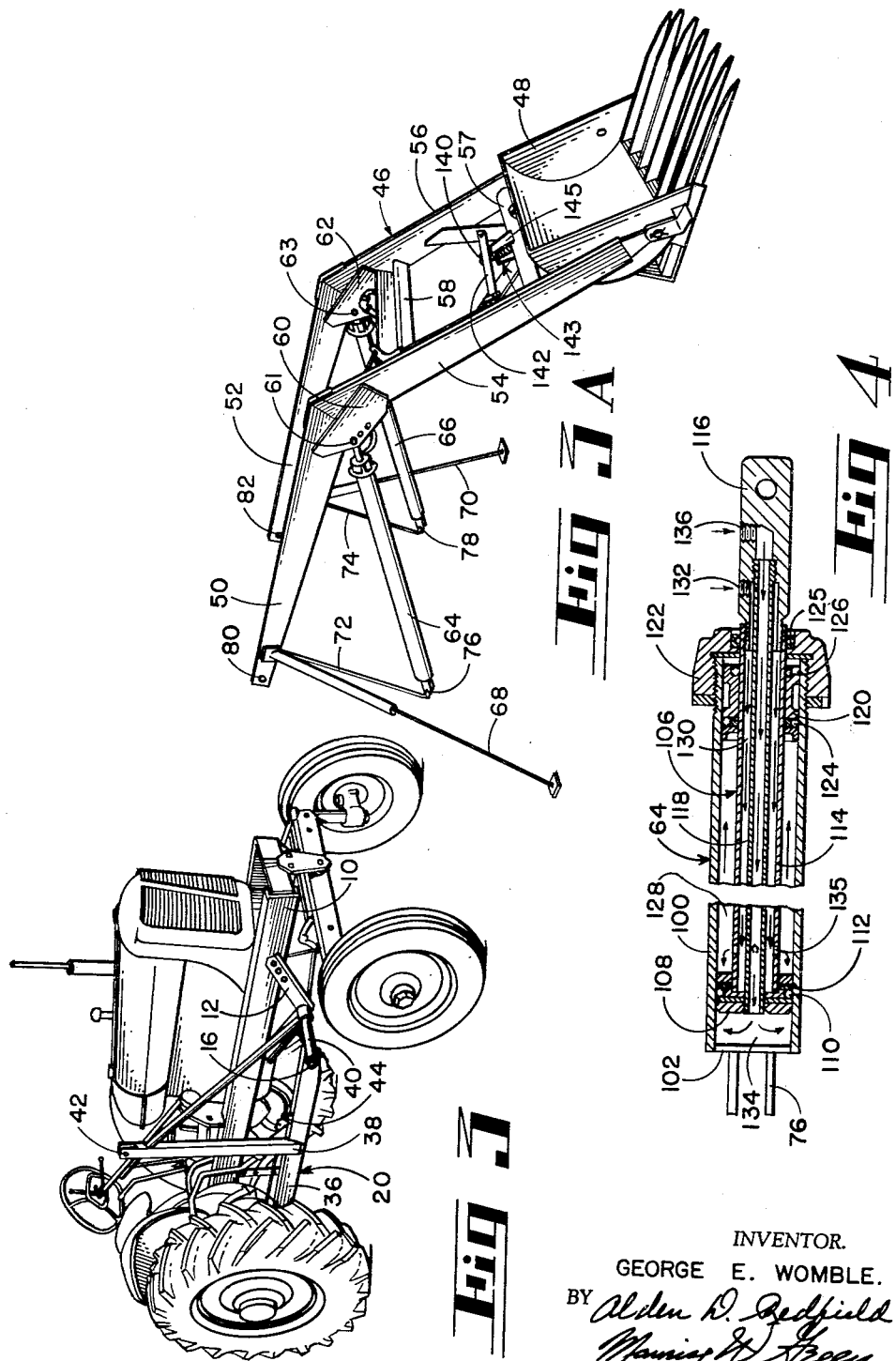

United States Patent Office 2,993,608
Patented July 25, 1961

2,993,608
LOADER
George E. Womble, Celina, Ohio, assignor to Avco Manufacturing Corporation, Cincinnati, Ohio, a corporation of Delaware
Filed Mar. 14, 1957, Ser. No. 646,161
1 Claim. (Cl. 214—140)

This invention relates to loaders of the general type used on farm tractors, comprising a bucket-carrying frame which projects from the tractor and is swung vertically from pivots by hydraulically operated cylinders thereby to lift a load from the ground to an elevated position for uses such as loading loose material into a transporting vehicle.

Loaders of the general type employing buckets which are operated by a swinging frame actuated by hydraulic cylinders have been used for some years in farming operations. One of the important advantages of such a unit, however, and one which has not been fully realized, is the ability to remove the loader from the tractor and to replace it on the tractor for operation when desired with a minor amount of time and effort. Many of the installations now in use require substantial time and effort to either assemble the loader onto the tractor or to remove it therefrom, and it would be a substantial advantage in the operation if the loader could be assembled onto the tractor in a very short time and removed from it in an equally short time to thereby make the tractor available for other work without any encumbrance of the loader mechanism when it is not needed and make it quickly available again with loader attached.

It is therefore a primary object of the present invention to provide a loader with suitable mounting and controls which can be assembled and disassembled from the tractor with a minimum time and effort.

It is a further object to provide a loader with fluid connections at one end only of the hydraulic cylinders, thereby reducing length and complication of the fluid carrying conduits.

Other objects of the invention will appear more fully from a detailed description and by reference to the accompanying drawings forming a part hereof and wherein:

FIGURE 1 is a perspective view of the assembled loader mounted on a tractor.

FIGURE 2 is a view of the hydraulic fluid lines and connections to the hydraulic cylinders, with a general showing of the tractor and loader, thereby disclosing the general arrangement of the hydraulic system.

FIGURE 3 shows the tractor with the subframe attached thereto, but with the loader frame removed from the tractor.

FIGURE 3–a is a view of the loader main frame and bucket with hydraulic cylinders attached and with a stand supporting the loader when removed from the tractor.

FIGURE 4 is a cross-sectional view of one of the hydraulic cylinders.

FIGURE 5 is a perspective view of the subframe showing the arrangement of the subframe and its connection to the tractor, the subframe shown in this figure being on the opposite side of the tractor from that shown in FIGURE 3.

FIGURE 6 shows the assembly of the bucket trip mechanism.

FIGURE 7 shows perspective view of the connections between the righthand boom member and the top of the subframe and the connection of the trip rod and the connections of the two hydraulic lines adjacent the righthand boom pivot.

FIGURE 8 is a cross-section through the spring actuated latch-pin comprising a part of the bucket trip mechanism.

Referring to the drawings, FIGURES 1 and 5, a tractor frame 10 has bracket pairs 12, 14 attached thereto, one pair of brackets being secured on each side of the tractor frame, the two bracket pairs 12 and 14 being shown in FIGURES 1 and 5, respectively. These brackets suspend a cross-shaft 16 beneath the tractor frame, and the cross-shaft 16 extends outwardly on both sides of the tractor as shown in FIGURES 1, 3, and 5. As shown in FIGURE 5, there is an axle bracket 18 secured to the rear axle of the tractor. The axle bracket 18 as shown in FIGURE 5 has a corresponding bracket on the other side of the tractor, which is not visible in FIGURES 1 and 3 as it is behind the rear wheel of the tractor, as will be evident on an inspection of these figures.

Referring to FIGURES 1, 3, and 5, two subframes are shown, the righthand subframe 20 being on the righthand side of the tractor and shown in FIGURES 1 and 3, the subframe 22 being on the opposite side of the tractor as shown in FIGURE 5. Referring to FIGURE 5, the subframe 22 is made up of a longitudinal member 24 and vertical member 26 extending upwardly at right angles to the longitudinal member 24 and rigidly secured thereto. The forward end of the longitudinal member 24 carries a rigidly secured tube 28, and a brace 30 extends from this tube 28 to the vertical member 26. The members 24, 26, 28, and 30, make up a rigid frame. At the top end of the vertical member 26 a pivot mounting 32 is formed, and on the longitudinal member a lug 34 is secured which also provides a pivot connection.

The subframe 22 (FIGURE 5) is secured to the tractor by sliding the tube 28 onto the extending end of shaft 16 and connecting the rear end of the longitudinal member 24 and the axle bracket 18 by a pin or other suitable fastening. The mounting of the subframe can be accomplished by sliding the tube 28 on the shaft 16 with the rear end of the longitudinal member 24 swung dowwardly, as allowed by turning of tube 28 on shaft 16, and, when the frame is in place on the shaft 16, the connection of the bracket 18 is accomplished by lifting the subframe so that it is in position to connect with the bracket 18.

The parts of the righthand subframe 20 (FIGURES 1 and 3) are similar, but of opposite hand so that there is on the righthand side of the tractor another subframe with longitudinal member 36, vertical member 38, tube 40 providing also pivot mounting 42 and lug 44, corresponding to 32 and 34 on the lefthand side (FIGURE 5).

Referring to FIGURES 1 and 3–a, there is shown a main frame 46 carrying a bucket 48, the bucket 48 being pivotally mounted on the main frame in a manner known in the art. The main frame 46 is made up of a pair of boom members 50 and 52 spaced apart and rigidly secured to lower boom members 54, 56, the booms being secured in the frame formation by cross-frame members 57 and 58 and gussets 60 and 62. The boom members 50, 52, 54, 56, when secured together, form a rigid frame, with the lower boom members 54, 56 extending downwardly while the boom members 50, 52 are substantially horizontal when the loader is in the position as shown in FIGURE 3–a and are spaced apart a distance sufficient to embrace the front portion of the tractor. A pair of hydraulic cylinders 64, 66 have their upper ends secured by pivotal connection to the gussets 60, 62, respectively, at 61, 63. The lower ends of the hydraulic cylinders 64, 66 have lugs 76, 78 for pivotal connection to lugs 44, 34 of the subframes 20, 22 (FIGURES 1 and 5) and the ends of boom members 50, 52 have holes 80, 82 to complete pivotal connection at 42, 32 on the subframes.

The frame 46 as shown in FIGURE 3–a is supported by two stand members 68, 70, which are also provided with hooks 72, 74. The hooks 72, 74 hold the cylinders in the angular position shown in FIGURE 3-a, and the stand members 68, 70 serve to hold the frame members 50, 52 in a substantially horizontal position as shown, the bucket 48 and the two stand members 68, 70 forming a 3-point support which allows the entire unit to stand on the ground or floor in the position shown.

The hydraulic cylinders 64, 66 for operating the loader are actuated from the hydraulic system available on the tractor, and it is assumed for the purpose of this description that hydraulic fluid under pressure can be supplied selectively in either of two lines adjacent the vertical member 38 of the righthand subframe 20, and it will be noted on reference to FIGURE 2 that two such lines 84, 86 are shown at the base of the vertical member 38 of subframe 20, and these two lines 84, 86 are shown in FIGURE 2 as extending vertically upward to a position adjacent the top of the vertical member 38 of the subframe 20. At this position adjacent the top, two short lengths of flexible tubing 88, 90 are provided which are connected to the lines 84, 86 by suitable fittings, and at their opposite ends these flexible lines are connected by fittings 87, 89 to tubes 92, 94 which extend along the inside surface of the righthand boom member 50 to a position adjacent the gusset 60 which is above the top end of the hydraulic cylinder 64. At this position there is a T-connection 91, 93 in each of the tubes 92, 94 connecting with flexible tubes 96, 98, the opposite ends of which tubes are secured to two inlet connections 132, 136 (see FIGURE 4) of the hydraulic cylinder 64. These tubes 92, 94 have continuing sections 95, 97 which extend beyond the aforesaid T-connections across the cross-frame 58 to the opposite gusset 62 and are there connected to flexible tubes 101, 103 for connection to the top end of the cylinder 66, which is a cylinder identical with the cylinder 64 and has connections similar to the previously described connections 132, 136 to which the two flexible lines connect.

FIGURE 4 shows a cross-section of cylinder assembly 64 positioned on the righthand side of the loader, which is identical with the lefthand cylinder 66. A cylinder casing 100 is sealed at the lefthand end as shown in FIGURE 4 by an end member 102 to which is secured the lower attaching lug 76 previously mentioned which is used to secure the lower end of the cylinder to the lug 44 of the subframe 20. Mounted to slide inside the cylinder casing 100, there is a ram assembly 106 which is made up of a piston 108 sealed for sliding contact with the interior wall of the cylinder 100 by O-ring seal 110 and leather back-up washers 112. The piston assembly 108 is secured to a ram shaft 114, which is in the form of a hollow tube substantially smaller than the interior diameter of the cylinder casing 100 and extends outward from the end of the cylinder casing and terminates in an integrally formed lug and distribution member 116. Inside the ram shaft 114 there is a second and smaller tube 118 which extends through and affords a passage to the opposite side of the piston 108 and extends into the lug and distribution member 116. Ram shaft assembly 106 is guided at the righthand end of the cylinder as shown in FIGURE 4 by a ram shaft guide 120, which is located near the outer end of the cylinder casing and is held in place by a cylinder cap 122 which also serves as a means to close the end of the cylinder around the ram shaft 114 and includes a wiper seal 125 and suitable O-ring seals 124, 126 are also provided in the ram shaft guide between the inner wall of the cylinder casing and the ram shaft guide as shown. The space between the ram shaft and the casing provides chamber 128, and the space between the tube 118 and the tube 114 provides a passageway 130 which connects with a lowering port 132 in the lug and distribution chamber 116 so that when fluid under pressure is fed into the lowering port 132 through the passageway 130 it may be fed into the chamber 128 through holes 135 in ram shaft 114 which are positioned near the piston toward the lefthand end of the ram assembly.

The tube 118 inside the ram shaft 114 extends through the center of the piston 108 so that it forms a passageway from the chamber 134, which is on the opposite side of the piston from the chamber 128. The passageway extends along the center of the ram shaft into the lug and distribution member 116 until it terminates in raising port 136. Thus, if fluid under pressure is fed into the raising port 136, the fluid will flow through the tube 118 into the chamber 134 and cause the entire ram assembly 106 to move toward the right, as shown in FIGURE 4, or to extend the length of the cylinder assembly 64; whereas, if the raising port connection is caused to release pressure and pressure is fed into the lowering port 132, the connections from the lowering port 132 into the previously mentioned chamber 128 through the holes 135, the result will be a movement of the ram assembly and piston 108 to the left, as viewed in FIGURE 4, and cause a shortening of the cylinder assembly 64.

Considering the above description of the hydraulic cylinder 64 and its identical counterpart 66, and referring also to the hydraulic system connections as previously described with reference to FIGURE 2, the feeding of fluid under pressure from the line 86 will feed this fluid through the line 94 and flexible connections 98 (see FIGURE 2) into the raising port 136 (FIGURE 4) and such flow of fluid will cause pressure to be built up in the chamber 134 on the lefthand side of the piston as viewed in FIGURE 4, and will cause extension of the length of the cylinder 64 and the corresponding cylinder 66 on the opposite side of the tractor and cause the main frame 46 to swing about the pivots 42, 32 and raise the entire frame with bucket 48 upwardly, such movement continuing while fluid is being fed and stopped when the fluid flow is stopped by suitable controls on the tractor. Conversely, the frame 46 will be lowered when the controls are reversed to allow fluid under pressure to be fed from the line 84 into the tube 92 and into the lowering port 132 (see FIGURE 4) which results in fluid under pressure in the chamber 128, which is on the opposite side of the piston from 134, thereby causing the retraction in length of the hydraulic cylinders 64, 66 and results in a lowering of the frame 46.

Referring to FIGURE 6, a bucket 48 is pivoted between the projecting ends of the lower boom members 54, 56, in such position that the loaded bucket 48 will tend to swing downwardly (i.e., clockwise) about the pivot, as viewed in FIGURE 6, to unload the bucket. However, at all times, except when it is desired to unload the bucket, the bucket is held in place by a latch pin 140 spring-loaded to project into a socket bracket 141 on the back face of the bucket 48 through the cross-member 57 (FIGURE 8). A spring assembly 143 held in a bracket 145 welded to cross-bar 57 completes the mounting of pin 140. The latch pin 140 is tripped against its normal spring loaded projecting position by a trip cross-arm 142 which is actuated manually by the driver of the tractor from a trip handle 144 which is supported on the vertical member 38 of the subframe 20 by a trip handle bracket 146. The connection between the trip handle 144 and the trip cross-arm 142 is completed by trip rod 148, center trip rod 150 and front trip rod 152 which connects to the end of the previously mentioned trip cross-arm 142 to release the latch pin 140 and thereby trip the load in the bucket 48. Pivot connection is provided at 154 for the trip rods 150, 152, and a trip rod connecting link 156 is mounted on the vertical member 38 and is of such length and position that a pivot connection 158 between the trip rod connecting link 156 and the center trip rod 150 is in alignment with the boom pivot 42 of the boom member 50 (see FIGURE 7). This alignment of the pivot connection 158 with the boom pivot 42, when the trip handle 144 is in normal latched position, is important, in that, when the loader is actuated to lift the frame 46 by hydraulic extension of the cylinders 64, 66 about the pivots 32, 42, the latch connection will not be disturbed or the lever 144 moved, inasmuch as the movement of the entire assembly will be about the aligned pivots 158 and 42 as shown by the axis line 160 (FIGURE 7).

It is also pertinent to consider that the disassembly of the flexible tube connections 87, 89, the pivot 158 and the pivot 42 (see FIGURE 7), together with the disconnection of pivot 32 on the opposite side of the tractor (see FIGURE 5), as well as the disconnection of the two lower pivots 44, 34 at the lower ends 76, 78 of the hydraulic cylinders, 64, 66, completes the disconnection of the entire loader assembly from the tractor.

Viewing the assembly of the unit as shown in FIGURES 3 and 3-a, and 5, the tractor as shown in FIGURE 3 has the two subframes 20, 22 connected thereto, and if the tractor is driven toward the right (FIGURE 3) between the projecting boom members 50, 52 of the main frame 46 (FIGURE 3-a), the boom pivot holes 80, 82 will be substantially in line with the boom pivot mountings 42 (see FIGURE 3) and 32 (see FIGURE 5), and suitable pin connections will complete the boom pivot connections of the main frame to the vertical members 38 and 26 of the subframes 20, 22. Also, the cylinders 64, 66, held substantially as shown in FIGURE 3-a, will have lower lugs 76, 78 closely adjacent lugs 44 and 34 of the subframe members 20, 22 on opposite sides of the tractor, and suitable pins at 76, 78 will cause lower pivot connection of the cylinders to the subframe members on lugs 44, 34. The stand members 68, 70 will be removed, and the loader unit will be assembled to the tractor in substantially the position shown in FIGURE 1.

The features of the arrangement as described make it possible to assemble or disassemble the tractor unit to and away from the loader by simply connecting or disconnecting: (1) the flexible connections 87, 89; (2) the pivots 42, 32; (3) the lower end connections 76, 78 of the cylinders to lugs 44, 34; and (4) the aligned pivot 158 from the center trip rod 150. Such disconnection will, when the stand units 68, 70 are put in place, enable the tractor to be backed away from the loader and used for other purposes, leaving the loader standing ready to be again "hitched up" and again made ready to operate.

It is further important that the hydraulic connections extending in two lines around the boom 50, across the cross-frame 58 and over to the opposite side with only short connections directly to the top end of the cylinders provides a simplification of mechanism, the importance of which is great in providing for simplicity of operation in dismounting and mounting of the loader. If it be assumed it was necessary to provide hydraulic connections at both ends of the cylinders, it can be understood that because of the variation in length of the cylinders during operation long loops of flexible connections would be necessary. However, when the connections are both at one end of the cylinder, and that end is adjacent the top of the frame, the hydraulic connections to the two cylinders are greatly simplified.

Although the mechanism has been described by reference to a specific structure found practical in actual operation, it is understood that variations are contemplated within the scope of the following claims.

I claim:

In a tractor mounted loader of the character described, a removable portion comprising, a main frame and a load carrying bucket having a trip mechanism for unloading, a pair of boom members in said frame and a pair of hydraulic cylinder units depending therefrom, each of said boom members having an horizontal portion and a forward, downwardly extending portion, a cylinder portion and a ram portion for each of said cylinder units, each of said ram portions being interconnected to said boom members at the intersection of said horizontal and forward, downwardly extending portions thereof, upper end connections for directing hydraulic fluid through said ram portion through the upper end only thereof for both extension and retraction, disconnectible boom pivots at the ends of said pair of boom members about which said frame swings, a disconnectible trip mechanism pivot connection for said bucket trip mechanism in alignment with one of said boom pivots, disconnectible lower end pivot connections for said hydraulic cylinder units, hydraulic operating connections from the upper end only of each of said cylinder units connecting with said two upper end connections and extending on said frame to the region of one of said boom pivot connections, disconnectible units of said hydraulic operating connections located at the region of said one boom pivot connection, whereby said loader may be removed from said tractor by: (1) disconnecting said boom pivot connections; (2) disconnecting said trip mechanism pivot connection near one of said boom pivots; (3) disconnecting said hydraulic connections also in the region of a boom pivot; and (4) disconnecting said lower end cylinder unit pivot connections.

References Cited in the file of this patent

UNITED STATES PATENTS

| | | |
|---|---|---|
| 605,399 | Cowles | June 7, 1898 |
| 2,306,313 | Johnson | Dec. 22, 1942 |
| 2,319,921 | Dooley | May 25, 1943 |
| 2,412,323 | Conrad | Dec. 10, 1946 |
| 2,468,602 | Lord | Apr. 26, 1949 |
| 2,489,629 | Ford | Nov. 29, 1949 |
| 2,495,143 | Simmonds | Jan. 17, 1950 |
| 2,635,585 | Damgaard | Apr. 21, 1953 |
| 2,665,017 | McNamara | Jan. 5, 1954 |
| 2,688,825 | Montanus | Sept. 14, 1954 |
| 2,701,072 | Chambers | Feb. 1, 1955 |
| 2,793,772 | Vig | May 28, 1957 |

OTHER REFERENCES

International Harvester Pub., CR-52-E 11/15, p. 26.
Mid-Western Industries Pub., on Davis Model 100 loader.